US009414634B2

(12) United States Patent
Gindin

(10) Patent No.: US 9,414,634 B2
(45) Date of Patent: Aug. 16, 2016

(54) CAMERA EQUIPPED HELMET

(75) Inventor: Jeffrey L. Gindin, Bellevue, WA (US)

(73) Assignee: Jeffrey L. Gindin

( * ) Notice: Subject to any disclaimer, the term of this patent is extended or adjusted under 35 U.S.C. 154(b) by 0 days.

(21) Appl. No.: 13/304,231

(22) Filed: Nov. 23, 2011

(65) Prior Publication Data
US 2013/0128046 A1 May 23, 2013

(51) Int. Cl.
*H04N 7/18* (2006.01)
*A42B 3/04* (2006.01)
*G07C 5/08* (2006.01)

(52) U.S. Cl.
CPC .......... *A42B 3/0426* (2013.01); *G07C 5/0891* (2013.01); *H04N 7/185* (2013.01)

(58) Field of Classification Search
USPC ................. 348/148; 2/410, 411, 422, 425
See application file for complete search history.

(56) References Cited

U.S. PATENT DOCUMENTS

| 2004/0141065 | A1* | 7/2004 | Hara et al. | 348/208.11 |
| 2007/0271687 | A1* | 11/2007 | Zhou | 2/410 |
| 2008/0239080 | A1* | 10/2008 | Moscato | 348/148 |
| 2011/0261176 | A1* | 10/2011 | Monaghan et al. | 348/61 |

* cited by examiner

*Primary Examiner* — Mehrdad Dastouri
*Assistant Examiner* — Kristin Dobbs
(74) *Attorney, Agent, or Firm* — Arjomand Law Group; Farjam Majd

(57) ABSTRACT

A method and an article of manufacture are disclosed configured to allow viewing of scenes not directly in the field of view of the viewer. In various embodiments, a helmet is equipped with a video camera, facing in a direction other than the direction of view of the user of the helmet, and a display visible to the user to display the images captured by the video camera. The helmet may be used while riding a bicycle, a motorcycle, a horse, while walking, and the like. In some embodiments, the video camera transmits data wirelessly and the direction of its view is adjustable. In some embodiments, a storage device is integrated in the helmet to allow recording of the images and sounds captured by the video camera for future download to another recording medium or a computing device.

16 Claims, 3 Drawing Sheets

CAMERA EQUIPPED HELMET

TECHNICAL FIELD

This application relates generally to helmets. More specifically, this application relates to a method and apparatus for safe riding using a camera-equipped helmet.

BRIEF DESCRIPTION OF THE DRAWINGS

The drawings, when considered in connection with the following description, are presented for the purpose of facilitating an understanding of the subject matter sought to be protected.

DETAILED DESCRIPTION

While the present disclosure is described with reference to several illustrative embodiments described herein, it should be clear that the present disclosure should not be limited to such embodiments. Therefore, the description of the embodiments provided herein is illustrative of the present disclosure and should not limit the scope of the disclosure as claimed. In addition, while the following description references riding a bicycle, it will be appreciated that the disclosure may be used with any kind of transportation including motorcycle, horse, on foot, and the like.

Briefly described, a method and an article of manufacture are disclosed configured to allow viewing of scenes not directly in the field of view of the viewer. In various embodiments, a helmet is equipped with a video camera, facing in a direction other than the direction of view of the user of the helmet, and a display visible to the user to display the images captured by the video camera. The helmet may be used while riding a bicycle, a motorcycle, a horse, while walking, and the like. In some embodiments, the video camera transmits data wirelessly and the direction of its view is adjustable. In some embodiments, a storage device is integrated in the helmet to allow recording of the images and sounds captured by the video camera for future download to another recording medium or a computing device.

People are becoming increasingly health and environment conscious, especially in the industrial nations. Additionally, with the gas prices soaring and traffic congestions worsening in large urban areas, people are encouraged to use their cars less and depend more on efficient public transportation, walk, or use bicycles. Some people also use motorcycles or scooters for space and energy efficiency. As such, people on foot, riding bicycles, or motorcycles are increasingly sharing the roadways with faster moving automobiles and trucks, increasing the chances of debilitating or fatal accidents. To address these and other safety concerns, it is desirable to provide better visibility to the roadways and environments in which a rider or walker commutes.

Figure 1:
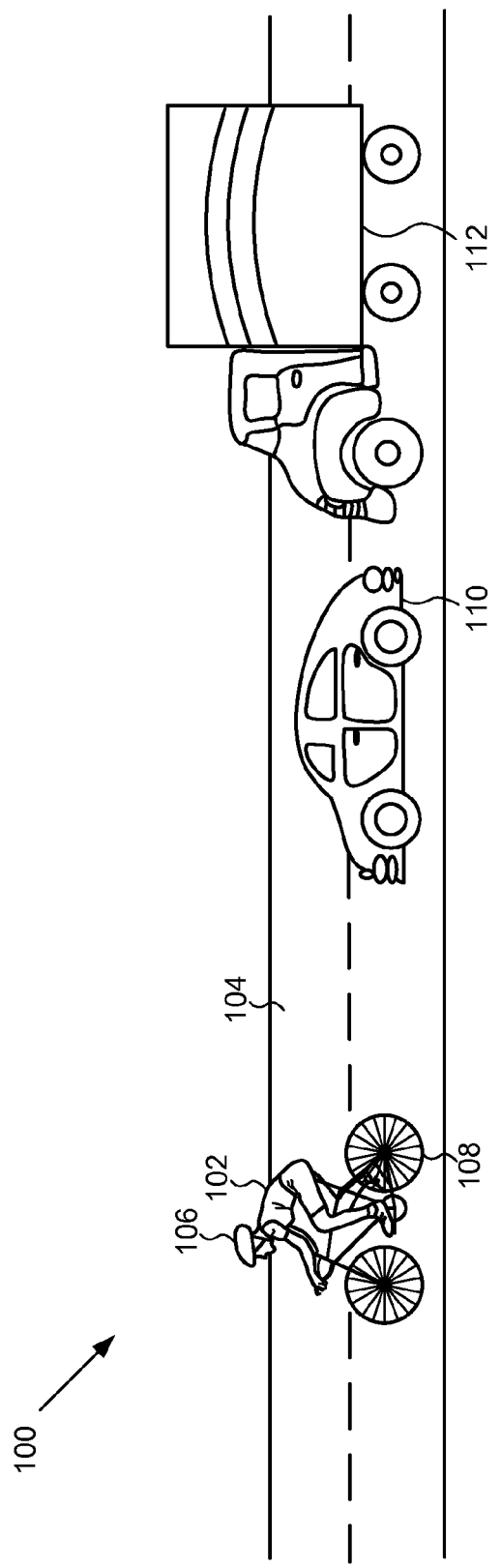
FIG. 1 shows an example operating environment including a bicycle in a traffic scene where the present disclosure may be practiced.

FIG. 1 shows an example operating environment including a bicycle in a traffic scene where the present disclosure may be practiced. Typically, traffic environment 100 may include bicycle rider 102 riding on roadway 104 wearing helmet 106 on bicycle 106. Rider 102 may share the roadway with other traffic such as car 110 and truck 112.

Rider 102 typically has limited view of other traffic moving behind his bicycle 108, usually using a rear view mirror. Rear view mirrors may offer limited visibility because of getting dirty, fogged up, and the like. Additionally, to look at a rear view mirror, the rider has to look down at the mirror and take his eyes off the road, reducing safety. Furthermore, rear view mirrors only show what is directly behind the bicycle, not what may be to the sides of the bicycle and not what is behind the rider's current field of view. For example, if the rider looks to the left of his bicycle, he cannot see what is behind his current field of view on the right side of the bicycle, even using rear view mirrors.

Figure 2:
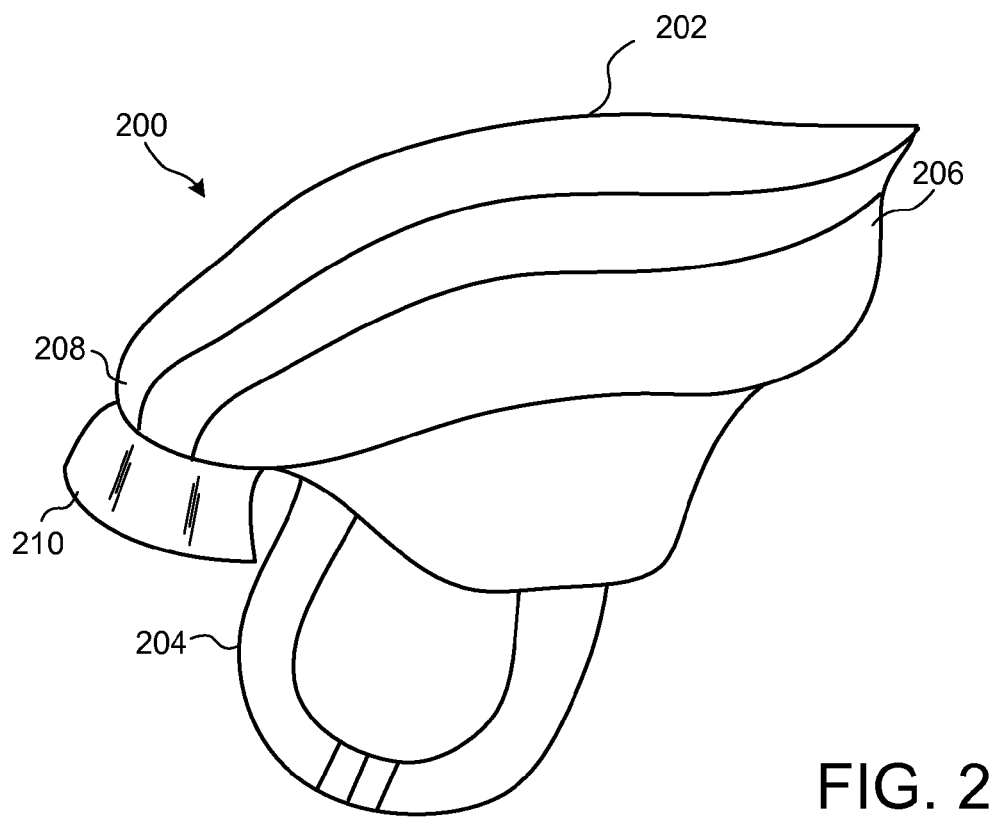
FIG. 2 shows an example bicycle helmet.

FIG. 2 shows an example bicycle helmet. The typical bicycle helmet 200 has head shield 202, chin strap 204, rear section 206, front section 208, and visor 210. In various embodiment, head shield 202 is typically made of plastic, padded leather, aluminum, Styrofoam, and the like, or a combination thereof. The head shield is the main component that protects the rider's head from impact in case of a fall or an accident.

In various embodiments, visor 210 may or may not exist as an integral part of the helmet. In some embodiments, visor 210 is detachable, while in other embodiments, visor 210 is permanently fixed. In still other embodiments, visor 210 may be movable to move in and out of view of the rider. In various embodiments, visor 210 shields the rider's eyes from ultra-violet rays of the sun and also reduces wind's blowing into the rider's face and eyes.

Figure 3A:
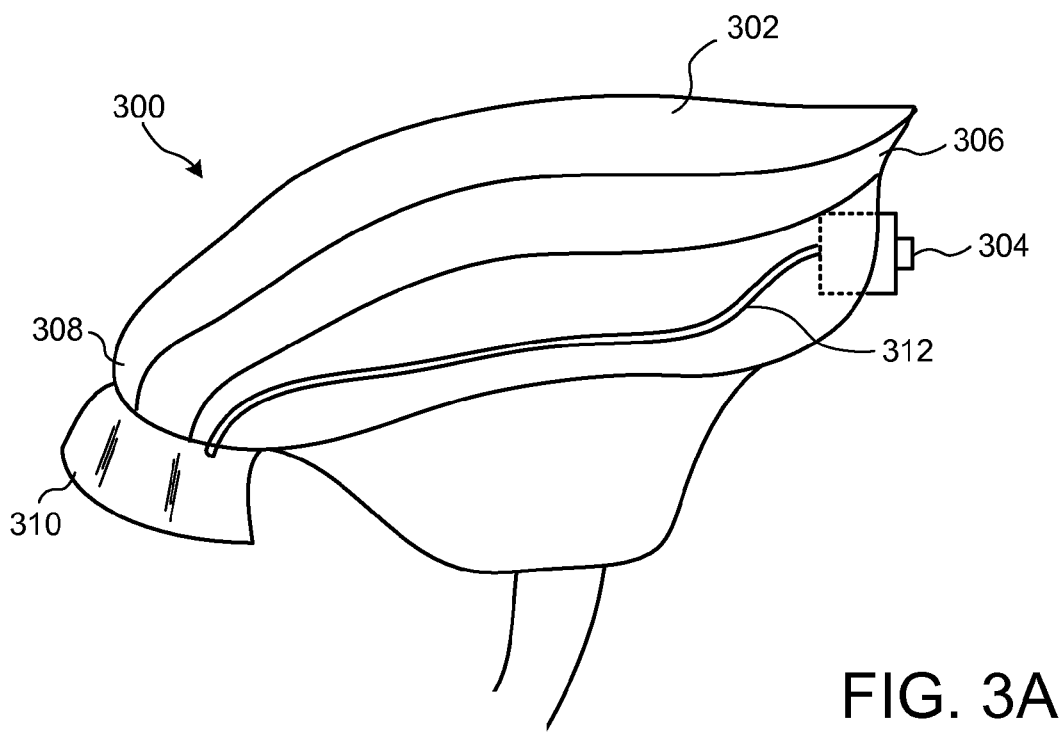
FIG. 3A shows an example bicycle helmet with an integrated camera and a visor.

FIG. 3A shows an example bicycle helmet with an integrated camera and a visor. In various embodiments, camera-equipped helmet 300 includes head shield 302, video camera 304 installed near rear section 306, front section 308 having display visor 310 attached thereto, and data cable 312 coupling video camera 304 to display visor 310.

In various embodiments, video camera 304 is embedded substantially in rear section 306 of head shield 302 facing towards the back of the rider and providing a viewing field 180° away from the center of the rider's field of view. In other embodiments, video camera 304 is placed on the side or top of head shield 302. In various embodiments, video camera 304 is internally embedded in head shield 302, while in other embodiments video camera 304 is externally installed, for example, using small attachment frame. In some embodiments, video camera 304 is built into helmet 300 at manufacture time, while in other embodiments, video camera 304 may be installed onto the helmet as an after-market accessory.

In various embodiments, visor 310 is integrated with helmet 300, while in other embodiments, visor 310 is installed as an after-market accessory. In some embodiments, visor 310 is fixed while in other embodiments, visor 310 is movable and/or detachable. In the latter embodiments, visor 310 may be moved in and out of the rider's field of view. Visor 310 is generally configured to filter the sun's ultraviolet light and reduce wind's blowing into the rider's face and eyes. In some embodiments, visor 310 is augmented with an electronic display, such as an LCD (Liquid Crystal Display) device, to receive and display image data from video camera 304 via a data cable 312. In some embodiments, the display may be turned on and off by the rider.

In some embodiments, video camera 304 and/or display visor 310 are powered by a battery pack embedded in the helmet, while in other embodiments, the camera and display may be powered by a battery pack attached to the rider's clothing or to the bicycle. In still other embodiments, the camera and display may be powered by a small electrical generator coupled with the bicycles' wheels to produce a small amount of electricity while the wheels are moving.

In various embodiments, video camera 304 is mounted on a gyroscopic base to maintain the camera's orientation while the rider turns his head away from the road behind him, ensuring the camera still substantially shows the road on the display. In some embodiments, the gyroscopic base may be disabled to allow the camera to show what it is directed towards as determined by the rider's direction of view, rather than maintaining a fixed direction. In some embodiments, the gyroscopic base may be disabled or enabled dynamically. In various embodiments, the gyroscopic base may be disabled by decoupling it from the camera.

Figure 3B:
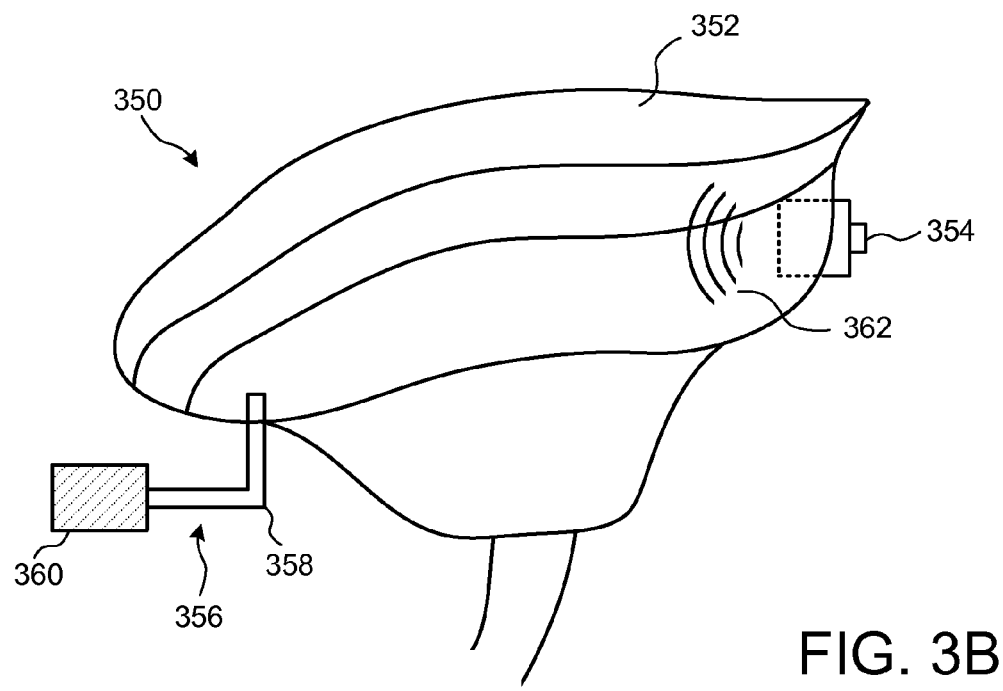
FIG. 3B shows an example bicycle helmet with a wireless camera and a viewer.

FIG. 3B shows an example bicycle helmet with a wireless camera and a viewer. In various embodiments, camera-equipped helmet 350 includes an embedded wireless video camera coupled to a display or viewer assembly 356 having positioning arm 358 and a display device 360 via communication radio waves 362.

In some embodiments, communication radio waves 362 are based on bluetooth technology, while in other embodiments, the radio waves are based on other wireless protocols such as WiFi (Wired or Wireless Fidelity). Those skilled in the art will appreciate that many other wireless protocols, now existing or developed in the future, may be used without departing from the spirit of the present disclosure.

In various embodiments, display device 360 of viewer 356 may be brought in and/or out of view of the rider using positioning arm 358. In some embodiments, display device 360 is detachable while in other embodiments display device 360 is fixed to the helmet. In some embodiments, display device is attached to the helmet using other techniques. For example, display may be attached to the top of the helmet and be flipped down and up to bring it in and out of view of the rider, respectively. In still other embodiments, the display device may be used in a detached manner. For example, the display device may be built into glasses worn by the rider and be wirelessly (or by wire) coupled with the video camera.

Figure 4:
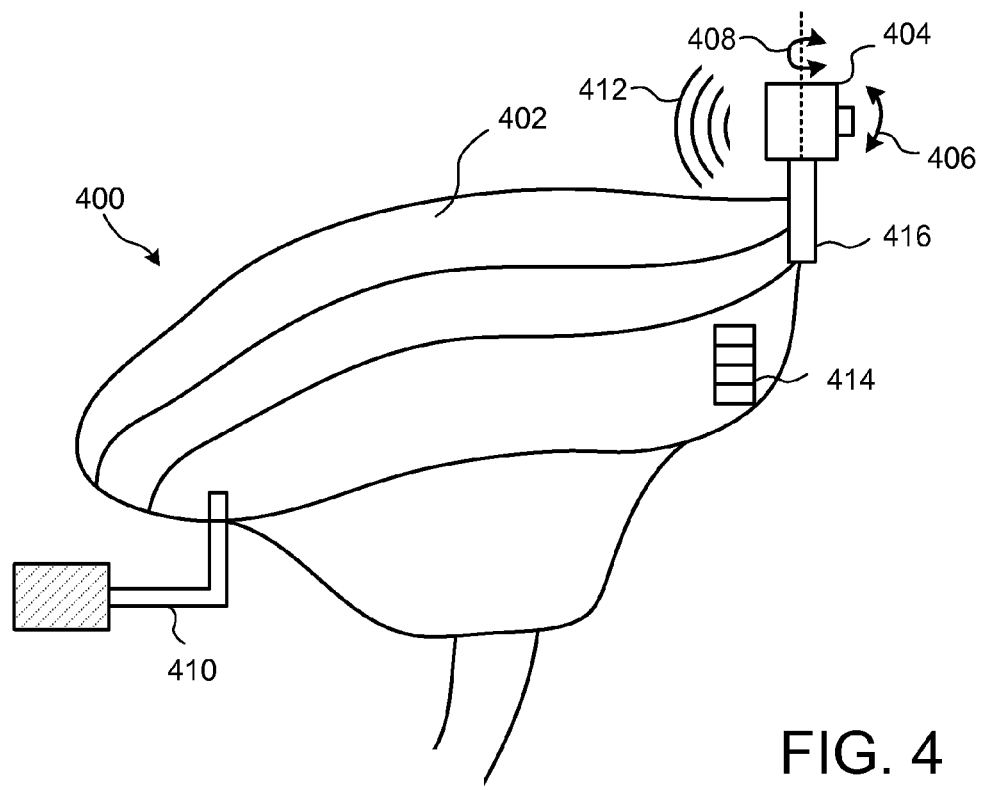
FIG. 4 shows an example bicycle helmet having a movable camera with adjustable viewing angle and a data storage device.

FIG. 4 shows an example bicycle helmet having a movable camera with adjustable viewing angle and a data storage device. In some embodiments, camera equipped helmet 400 includes head shield 402, video camera 404 attached to support frame 416 coupled with head shield 402 and movable in up and down directions 406 or left and right directions 408 relative to head shield 402. In some embodiments, video camera 404 communicates data wirelessly via radio waves 412 to viewer 410 and/or data storage device 414.

In various embodiments, video camera 404 is attached to helmet 400 via support frame 416 which allows changing of the camera's view in an up-and-down and/or side-to-side direction. This way the rider may choose which direction he wants to view through viewer 410. In some embodiments, the video camera is positionable manually while in other embodiments the video camera is positioned using a motorized arrangement with wired or wireless controls.

In various embodiments, data storage device 414 may be used to record the video data the generated by the video camera. In some embodiments, data storage device 414 is build into the helmet, while in other embodiments, it is attached to the rider's clothing or the bicycle. Recording such data may be useful in documenting how an accident happened after the fact. Additionally, such recordings may be used to document the rider's journey for various purposes such as for family movies, sports training, and the like. In some embodiments, data storage device 414 may be used to download the recording data to other data recording media like optical discs and/or to a computing device for permanent storage or sharing.

Changes can be made to the claimed invention in light of the above Detailed Description. While the above description details certain embodiments of the invention and describes the best mode contemplated, no matter how detailed the above appears in text, the claimed invention can be practiced in many ways. Details of the system may vary considerably in its implementation details, while still being encompassed by the claimed invention disclosed herein.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the claimed invention to the specific embodiments disclosed in the specification, unless the above Detailed Description section explicitly defines such terms. Accordingly, the actual scope of the claimed invention encompasses not only the disclosed embodiments, but also all equivalent ways of practicing or implementing the claimed invention.

The above specification, examples, and data provide a complete description of the manufacture and use of the composition of the invention. Since many embodiments of the invention can be made without departing from the spirit and scope of the invention, the invention resides in the claims hereinafter appended. It is further understood that this disclosure is not limited to the disclosed embodiments, but is intended to cover various arrangements included within the spirit and scope of the broadest interpretation so as to encompass all such modifications and equivalent arrangements.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While the present disclosure has been described in connection with what is considered the most practical and preferred embodiment, it is understood that this disclosure is not limited to the disclosed embodiments, but is intended to cover various arrangements included within the spirit and scope of the broadest interpretation so as to encompass all such modifications and equivalent arrangements.

What is claimed is:

1. A helmet comprising:
    a head shield;
    a video camera coupled with the head shield and configured to generate video data from a scene substantially not in the field of view of a wearer of the helmet;
    a mounting base configured to act as a gyroscopic base and couple the video camera as a whole unit with the helmet and further configured to automatically, without user input, maintain a desired fixed direction of the video camera with respect to ground independent of an orientation or change of orientation of the helmet with respect to the ground; and
    a display device directly coupled with the video camera and configured to display the video data.

2. The helmet of claim 1, further comprising a data storage device configured to receive and record data from the video camera.

3. The helmet of claim 1, further comprising a visor configured to allow integration of the display device with the helmet.

4. The helmet of claim 1, further comprising a support frame coupled with the video camera and configured to allow the video camera to be directed to various directions with respect to the helmet.

5. The helmet of claim 1, wherein the helmet is a bicycle helmet.

6. The helmet of claim 1, wherein the video camera is a wireless video camera configured to transmit data wirelessly.

7. The helmet of claim 6, wherein the wireless video camera uses bluetooth wireless protocol for data transmission.

8. The helmet of claim 1, wherein the display device is part of a viewer assembly coupled with the helmet.

9. The helmet of claim 1, wherein the display device is coupled to glasses configured to be worn by a rider wearing the helmet, and wherein the display device has a data connection with the video camera.

10. A method of viewing a roadway by a rider, the method comprising:
    wearing a helmet configured to couple to a video camera, using a mounting base configured to act as a gyroscopic base and couple the video camera as a whole unit with the helmet and further configured to automatically, without user input, maintain a desired fixed direction of the video camera with respect to ground independent of an orientation or change of orientation of the helmet with respect to the ground, wherein the video camera is configured to generate video data from a scene substantially not in the field of view of the rider, and wherein a display device is integrated with the helmet; and
    viewing video data generated by the video camera sent directly to the display device.

11. The method of claim 10, further comprising a storage device configured to receive the video data generated by the video camera.

12. The method of claim 10, wherein the display device is integrated with a visor attached to the helmet.

13. The method of claim 10, wherein the display device is part of a viewer assembly coupled with the helmet.

14. The method of claim 10, wherein the display device is coupled to glasses configured to be worn by the rider, and wherein the display device has a data connection with the video camera.

15. The method of claim 10, wherein the video camera transmits video data wirelessly using bluetooth protocol.

16. The method of claim 10, wherein the video camera is configured to be directed in various directions by the rider.

* * * * *